UNITED STATES PATENT OFFICE.

NIELS C. CHRISTENSEN, OF SALT LAKE CITY, UTAH.

PROCESS OF TREATING LEAD-ZINC SULPHIDE ORES.

1,415,796.     Specification of Letters Patent.     Patented May 9, 1922.

No Drawing.    Application filed October 11, 1919. Serial No. 330,035.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Lead-Zinc Sulphide Ores, of which the following is a specification.

This invention relates to the treatment of lead zinc-sulphide ores. My process is a combination of the process of treating zinc sulphide ores described in my application No. 327,402 and the processes for treating galena ores described in my applications Serial Nos. 327,400 and 327,401.

The process consists in treating the comminuted ore or concentrates with a hot concentrated sulphuric acid solution of such strength that the zinc is dissolved as the sulphate and the sulphur driven off as $H_2S$, as indicated in the following equation:

$$ZnS + H_2SO_4 = ZnSO_4 + H_2S$$

This operation should preferably be carried out with acid of a concentration between 50% and 70% $H_2SO_4$ in order to avoid sulphating the galena or dissolving any of the lead as a sulphate in the hot acid. If acid stronger than 70% $H_2SO_4$ is used the galena is somewhat acted upon and the lead sulphate formed is dissolved in the hot acid and contaminates the zinc sulphate. The silver sulphide in the blende and galena is not acted upon by the 50%-70% $H_2SO_4$ but stronger acid does act upon the silver and sulphates it in about the same proportion as the lead is dissolved. By using approximately 60% acid at a temperature near its boiling point practically all the zinc is dissolved as a sulphate, and the galena and silver sulphide are not sulphated ore dissolved. As noted in my application No. 327,402 the hot acid will hold much more $ZnSO_4$ in solution than the cold acid, and I take advantage of this to separate the zinc sulphate from the solution. Such a proportion of acid to ore is used that a hot concentrated solution of zinc sulphate is formed by the foregoing treatment. This hot acid solution of zinc sulphate is filtered away from the residue of the ore and cooled, and the zinc sulphate precipitated and the cold acid filtered or drained away, leaving the zinc sulphate. By this method practically all the zinc may be separated from the sulphide ores of zinc as a high grade zinc sulphate product, leaving the galena and silver untouched along with the pyrite, chalcopyrite and gangue minerals.

The separation of the lead and silver from this residue from the zinc treatment is made by treating it with a hot chloride solution containing acid or ferric chloride as described in my applications Serial Nos. 327,400 and 327,401 and the silver and lead dissolved as a chloride in the hot acid solution as indicated below, the sulphur being driven off as $H_2S$ or metallic sulphur, and the ferric chloride being reduced to ferrous chloride.

$$PbS + 2HCl = PbCl_2 + 2H_2S$$
$$Ag_2S + 1HCl = AgCl + H_2SO$$
$$PbS + 2FeCl_3 = PbCl_2 + 2FeCl_2 + S$$
$$Ag_2S + FeCl_3 = AgCl + FeCl_2 + S$$

The hot solution containing the lead and silver is filtered away from the gangue material and the silver is preferably precipitated therefrom with metallic lead and the lead either by cooling or by electrolysis, or by a combination of both. The hot chloride solutions dissolve a much larger amount of lead chloride than the cold solutions, and the lead chloride may be separated from the chloride solution by taking advantage of this fact. Such a proportion of solution to ore is used that a hot concentrated solution of lead chloride is secured by the before described treatment. This solution is filtered away from the ore and then cooled and the lead chloride precipitated and separated from the cold solution. The precipitation of the lead by electrolysis is preferably used when the dissolving solution contains ferric chloride and the ferrous chloride thus formed is regenerated by the chlorine given off in the electrolysis. The chloride solution may be electrolyzed with an insoluble anode in a cell with a diaphragm separating the cell into anode and cathode compartments. The ferrous solution containing the lead chloride is led first into the cathode compartment where the lead is precipitated, and then into the anode compartment where the ferrous chloride is changed to ferric chloride by the chlorine as indicated below:

$$PbCl_2 = Pb + Cl_2$$
$$2FeCl_2 + Cl_2 = 2FeCl_3$$

The precipitated lead chloride may also be melted and electrolyzed to secure lead bullion and chlorine. The chlorine thus secured is led into the ferrous solution where it unites with the ferrous chloride to form ferric chloride thus regenerating the dissolving solution.

By this process practically all the lead and all the silver in the galena and blende (or in the ore in the form of sulphide) are recovered in a very pure condition.

The residue from this treatment is especially well suited to treatment by flotation to separate the pyrite or chalcopyrite from the silicious gangue material and a very complete recovery of these may be made by this method.

From the foregoing it is seen that by my combined process a practically-complete separation and practically complete extraction of the lead, zinc, silver, and pyrite and chalcopyrite, may be secured from the complex lead-zinc sulphide ores which have long been an unsolved metallurgical problem.

Having described my process what I claim and desire to patent is:

1. The process of treating lead-zinc sulphide ores and concentrates which consists in treating the comminuted ore with hot concentrated sulphuric acid, thereby dissolving the zinc as a sulphate, separating the hot acid solution from the residue of the ore, and cooling said solution and thereby precipitating zinc sulphate therefrom, treating the residue of ore from foregoing treatment with a hot concentrated chloride solution containing acid and thereby dissolving the lead and silver as chlorides, and separating last said hot solution from the remainder of the ore and precipitating the silver and lead therefrom.

2. The process of treating lead-zinc sulphide ores and concentrates which consists in treating the comminuted ore with hot concentrated sulphuric acid, thereby dissolving the zinc as a sulphate, separating the hot acid solution from the residue of the ore, and cooling said solution and thereby precipitating zinc sulphate therefrom, treating the residue of ore from foregoing treatment with a hot concentrated chloride solution containing acid and thereby dissolving the lead and silver as chlorides and separating last said hot solution from the remainder of the ore and precipitating the lead chloride therefrom by cooling.

3. The process of treating lead-zinc sulphide ores and concentrates which consists in treating the comminuted ore with hot concentrated sulphuric acid, thereby dissolving the zinc as a sulphate, separating the hot acid solution from the residue of the ore, and cooling said solution and thereby precipitating zinc sulphate therefrom, treating the residue of ore from foregoing treatment with a hot concentrated chloride solution containing acid, and thereby dissolving the lead and silver as chlorides, and separating last said hot solution from the remainder of the ore and precipitating the silver and lead therefrom, and treating the residue from said treatments by flotation for the recovery of the remaining sulphides therefrom.

4. The process of treating lead-zinc sulphide ores and concentrates which consists in treating the comminuted ore with hot concentrated sulphuric acid, thereby dissolving the zinc as a sulphate, separating the hot acid solution from the residue of the ore, and cooling said solution and thereby precipitating zinc sulphate therefrom, treating the residue of ore from foregoing treatment with a hot concentrated chloride solution containing ferric chloride, and thereby dissolving the lead and silver as chlorides, and separating last said hot solution from the remainder of the ore and precipitating the silver and lead therefrom.

5. The process of treating lead-zinc sulphide ores and concentrates which consists in treating the comminuted ore with hot concentrated sulphuric acid, thereby dissolving the zinc as a sulphate, separating the hot acid solution from the residue of the ore, and cooling said solution and thereby precipitating zinc sulphate therefrom, treating the residue of ore from foregoing treatment with a hot concentrated chloride solution containing acid and thereby dissolving the lead and silver as chlorides, and separating last said hot solution from the remainder of the ore, and precipitating the silver therefrom with metallic lead and the lead chloride by cooling.

6. The process of treating lead-zinc sulphide ores and concentrates which consists in treating the comminuted ore with hot concentrated sulphuric acid, thereby dissolving the zinc as a sulphate, separating the hot acid solution from the residue of the ore, and cooling said solution, and thereby precipitating zinc sulphate therefrom, treating the residue of ore from foregoing treatment with a hot concentrated chloride solution containing acid, and thereby dissolving the lead and silver as chlorides, and separating last said hot solution from the remainder of the ore, and precipitating the silver therefrom with metallic lead and lead chloride therefrom by cooling.

7. The process of treating lead-zinc sulphide ores and concentrates which consists in treating the comminuted ore with hot concentrated sulphuric acid, thereby dissolving the zinc as a sulphate, separating the hot acid solution from the residue of the ore, and cooling said solution, and thereby precipitating zinc sulphate therefrom, treating the residue of ore from foregoing treatment with a hot concentrated chloride solution containing ferric chloride, and thereby dissolving the lead and silver as chlorides, and separating last said hot solution from the remainder of the ore, and precipitating the silver therefrom with metallic lead and lead chloride by cooling.

8. The process of treating lead-zinc sulphide ores and concentrates which consists in treating the comminuted ore with hot concentrated sulphuric acid, thereby dissolving the zinc as a sulphate, separating the hot acid solution from the residue of the ore, and cooling said solution, and thereby precipitating zinc sulphate therefrom, treating the residue of ore from foregoing treatment with a hot concentrated chloride solution containing ferric chloride, and thereby dissolving the lead and silver as chlorides and reducing the ferric iron to the ferrous condition, and separating last said solution from the remainder of the ore, and precipitating the silver therefrom, with metallic lead and lead chloride therefrom by cooling, and precpitating the lead from the lead chloride by electrolysis, and using the chlorine formed in said electrolysis to change the ferrous iron formed in last mentioned treatment to the ferric condition, and using said ferric solution in the treatment of more ore.

9. The process of treating lead-zinc sulphide ores and concentrates which consists in treating the comminuted ore with hot concentrated sulphuric acid, thereby dissolving the zinc as a sulphate, separating the hot acid solution from the residue of the ore, and cooling said solution, and thereby precipitating zinc sulphate therefrom and separating said zinc sulphate from the cold solution and using it in the treatment of more ore, treating the residue of ore from foregoing treatment with a hot concentrated chloride solution containing acid, and thereby dissolving the lead and silver as chlorides, and separating last said hot solution from the remainder of the ore, and precipitating the silver and lead therefrom.

10. The process of treating lead-zinc sulphite ores and concentrates which consists in treating the comminuted ore with hot concentrated sulphuric acid, thereby dissolving the zinc as a sulphate, separating the hot acid solution from the residue of the ore, and cooling said solution and thereby precipitating zinc sulphate therefrom, treating the residue of ore from foregoing treatment with a hot concentrated chloride solution containing acid and thereby dissolving the lead and silver as chlorides, and separating last said hot solution from the remainder of the ore and precipitating the silver and lead therefrom, and using last said solution in the treatment of more ore.

11. The process of treating lead-zinc sulphite ores and concentrates which consists in treating the comminuted ore with hot concentrated sulphuric acid containing between 50% and 75% acid, thereby dissolving the zinc as a sulphate, separating the hot acid solution from the residue of the ore, and cooling said solution and thereby precipitating zinc sulphate therefrom, treating the residue of ore from foregoing treatment with a hot concentrated chloride solution containing acid and thereby dissolving the lead and silver as chlorides, and separating last said hot solution from the remainder of the ore and precipitating the silver and lead therefrom.

12. The process of treating lead-zinc sulphide ores and concentrates which consists in treating the comminuted ore with hot concentrated sulphuric acid containing between 50% and 75% acid, thereby dissolving the zinc as a sulphate, separating the hot acid solution from the residue of the ore, and cooling said solution and thereby precipitating zinc sulphate therefrom, treating the residue of ore from foregoing treatment with a hot concentrated chloride solution containing acid and thereby dissolving the lead and silver as chlorides, and separating last said hot solution from the remainder of the ore and precipitating the lead chloride therefrom by cooling.

13. The process of treating lead-zinc sulphide ores and concentrates which consists in treating the comminuted ore with hot concentrated sulphuric acid containing between 50% and 75% acid, thereby dissolving the zinc as a sulphate, separating the hot acid solution from the residue of the ore, and cooling said solution and thereby precipitating zinc sulphate therefrom, treating the residue of ore from foregoing treatment with a hot concentrated chloride solution containing acid, and thereby dissolving the lead and silver as chlorides, and separating last said hot solution from the remainder of the ore and precipitating the silver and lead therefrom, and treating the residue from said treatments by flotation for the recovery of the remaining sulphides therefrom.

14. The process of treating lead-zinc sulphide ores and concentrates which consists in treating the comminuted ore with hot concentrated sulphuric acid containing between 50% and 75% acid, thereby dissolving the zinc as a sulphate, separating the hot acid solution from the residue of the ore, and cooling said solution and thereby precipitating zinc sulphate therefrom, treating the residue of ore from foregoing treatment with a hot concentrated chloride solution containing ferric chloride, and thereby dissolving the lead and silver as chlorides, and separating last said hot solution from the remainder of the ore and precipitating the silver and lead therefrom.

15. the process of treating lead-zinc sulphide ores and concentrates which consists in treating the comminuted ore with hot concentrated sulphuric acid, containing between 50% and 75% acid, thereby dissolving the zinc as a sulphate, separating the hot acid solution from the residue of the ore, and cooling said solution and thereby precipitating zinc sulphate therefrom, treating the residue of ore from foregoing treatment with a hot concentrated chloride solution containing acid and thereby dissolving the lead and silver as chlorides, and separating last said hot solution from the remainder of the ore, and precipitating the silver therefrom with metallic lead and the lead chloride by cooling.

16. The process of treating lead-zinc sulphide ores and concentrates which consists in treating the comminuted ore with hot concentrated sulphuric acid, containing between 50% and 75% acid, thereby dissolving the zinc as a sulphate, separating the hot acid solution from the residue of the ore, and cooling said solution, and thereby precipitating zinc sulphate therefrom, treating the residue of ore from foregoing treatment with a hot concentrated chloride solution containing acid, and thereby dissolving the lead and silver as chlorides, and separating last said hot solution from the remainder of the ore, and precipitating the silver therefrom with metallic lead and lead chloride therefrom by cooling.

17. The process of treating lead-zinc sulphide ores and concentrates which consists in treating the comminuted ore with hot concentrated sulphuric acid containing between 50% and 75% acid, thereby dissolving the zinc as a sulphate, separating the hot acid solution from the residue of the ore, and cooling said solution, and thereby precipitating zinc sulphate therefrom, treating the residue of ore from foregoing treatment with a hot concentrated chloride solution containing ferric chloride, and thereby dissolving the lead and silver as chlorides, and separating last said hot solution from the remainder of the ore, and precipitating the silver therefrom with metalic lead and lead chloride by cooling.

18. The process of treating lead-zinc sulphide ores and concentrates which consists in treating the comminuted ore with hot concentrated sulphuric acid containing between 50% and 75% acid, thereby dissolving the zinc as a sulphate, separating the hot acid solution from the residue of the ore, and cooling said solution, and thereby precipitating zinc sulphate therefrom, treating the residue of ore from foregoing treatment with a hot concentrated chloride solution containing ferric chloride, and thereby dissolving the lead and silver as chlorides and reducing the ferric iron to the ferrous condition, and separating last said solution from the remainder of the ore, and precipitating the silver therefrom, with metallic lead and lead chloride therefrom by cooling, and precipitating the lead from the lead chloride by electrolysis, and using the chlorine formed in said electrolysis to change the ferrous iron formed in last mentioned treatment to the ferric condition, and using said ferric solution in the treatment of more ore.

19. The process of treating lead-zinc sulphide ores and concentrates which consists in treating the comminuted ore with hot concentrated sulphuric acid containing between 50% and 75% acid, thereby dissolving the zinc as a sulphate, separating the hot acid solution from the residue of the ore, and cooling said solution, and thereby precipitating zinc sulphate therefrom and separating said zinc sulphate from the cold solution and using it in the treatment of more ore, treating the residue of ore from foregoing treatment with a hot concentrated chloride solution containing acid, and thereby dissolving the lead and silver as chlorides, and separating last said hot solution from the remainder of the ore, and precipitating the silver and lead therefrom.

20. The process of treating lead-zinc sulphide ores and concentrates which consists in treating the comminuted ore with hot concentrated sulphuric acid containing between 50% and 75% acid, thereby dissolving the zinc as a sulphate, separating the hot acid solution from the residue of the ore, and cooling said solution and thereby precipitating zinc sulphate therefrom, treating the residue of ore from foregoing treatment with a hot concentrated chloride solution containing acid and thereby dissolving the lead and silver as chlorides, and separating last said hot solution from the remainder of the ore, and precipitating the silver and lead therefrom, and using last said solution in the treatment of more ore.

In testimony whereof I have signed my name to this specification.

NIELS C. CHRISTENSEN.